Nov. 23, 1943.  L. V. MALLORY  2,334,828
ANTITHEFT WHEEL
Filed May 27, 1942  3 Sheets-Sheet 1

Louis V. Mallory,
INVENTOR.

BY Victor J. Evans & Co.
ATTORNEYS

Nov. 23, 1943.                L. V. MALLORY                2,334,828
                              ANTITHEFT WHEEL
                           Filed May 27, 1942           3 Sheets-Sheet 2

Louis V. Mallory,
INVENTOR.

BY
Victor J. Evans & Co.
ATTORNEYS

Nov. 23, 1943.   L. V. MALLORY   2,334,828
ANTITHEFT WHEEL
Filed May 27, 1942   3 Sheets-Sheet 3
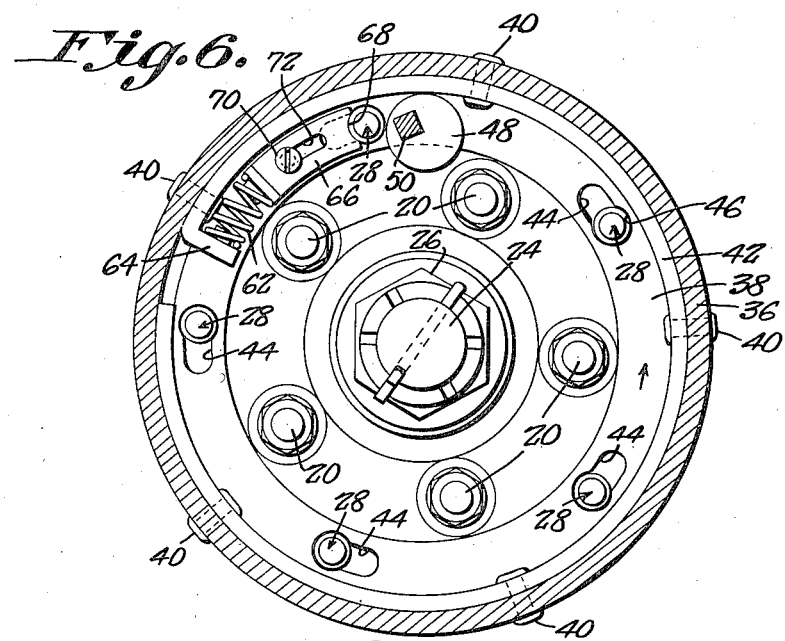
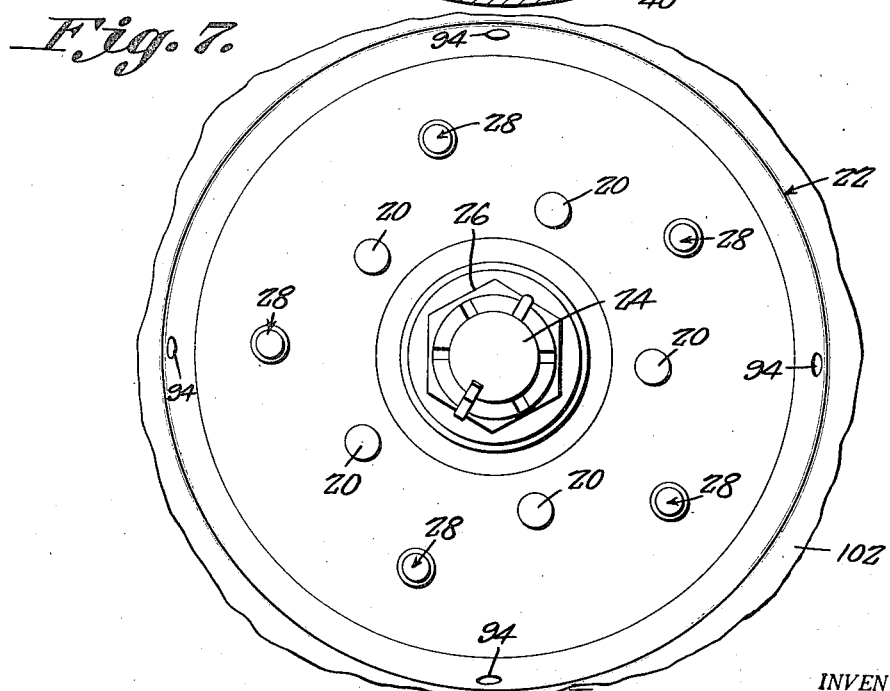
INVENTOR,
Louis V. Mallory
BY
Victor J. Evans & Co.
ATTORNEYS Patented Nov. 23, 1943

2,334,828

UNITED STATES PATENT OFFICE 2,334,828

ANTITHEFT WHEEL

Louis V. Mallory, Rock Island, Ill.

Application May 27, 1942, Serial No. 444,749

5 Claims. (Cl. 70—259)

My invention relates to automotive vehicles, and has among its objects and advantages the provision of an improved tire and wheel protector so designed as to prevent unauthorized removal of the tire or the wheel.

In the accompanying drawings:

Figure 6 is a face view of the wheel securing means with portions illustrated in section; and Figure 7 is a face view of the central area of the vehicle wheel with the greater part of the wheel securing means removed.

Figure 2:
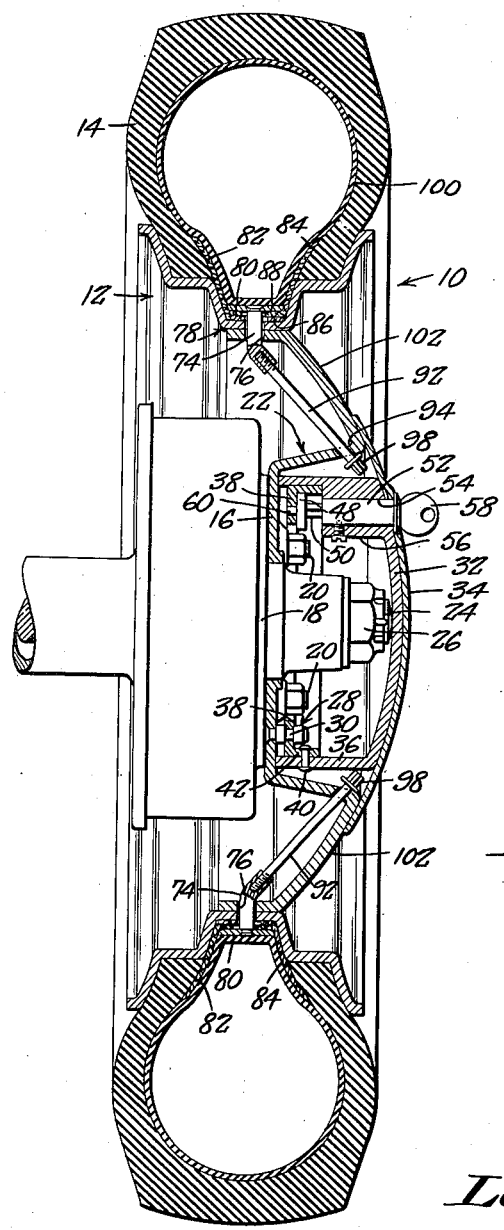
Figure 2 is a transverse sectional view.

In the embodiment selected for illustration, Figure 2 illustrates a conventional automobile wheel 10 wherein the rim 12 supports a tire casing 14 in the usual manner. The wheel of Figure 2 comprises a pressed steel proposition of conventional design wherein the wheel flange 16 is detachably secured to the brake drum and hub combination 18 through the medium of the usual hub bolts 20. The flange 16 is dished at 22 to provide a housing for the axle 24 and the axle nut 26 covered by a hub cap coacting with the dished portion 22 to provide an enclosure for the hub bolts, the axle end and its nut 26. In the instant case the usual hub cap is dispensed with. To the flange 16 are fixedly secured a plurality of pins or anchor posts 28. These pins are equally spaced one from the other and arranged concentrically of the axis of the wheel. Each pin is provided with a circumferential groove 30.

In lieu of the usual hub cap, I make use of a cap member 32 having an ornamental plate 34 secured thereto to provide a cover for the dished formation 22. An annular flange 36 is provided on the cap member 32 of such diameter as to be receivable inside the dished formation 22 and to have edge engagement with the wheel flange 16.

Inside the flange 36 is fixedly secured an annular flange 38, as by rivets 40, extending through a connecting flange 42 and the annular flange 36. Flange 38 lies in the plane of the circumferential grooves 30 in the pins 28.

Figure 6 illustrates the flange 38 as being provided with slots 44 centered on a circle passing through the axes of the pins 28 and having enlargements 46 through which the pins 28 may be inserted. The remaining portions of the slots are sufficiently wide to freely receive the small diameters of the pins 28. Thus the flange 38 may be assembled with the pins 28 by bringing the latter into registration with the enlargements 46 and then rotating the annular flange through the medium of the cap member 32 to bring the narrow extents of the slots into the circumferential grooves 30. When so positioned, the cap member 32 is effectively latched against relative axial shifting with respect to the wheel axis.

Means for latching the cap member 32 and its flange 38 against accidental relative movement comprises a cam 48 secured to a rotary spindle 50 and operatively connected with a key-actuated mechanism in the lock cylinder 52 mounted in a bore 54 in a body 56 formed on the flange 36. The cam 48 is in the nature of an eccentric and may be rotated through the medium of a key 58 insertable in the cylinder 52. The key-actuated lock is of conventional construction and need not be described in detail. The spindle 50 is provided with a shaft 60 rotatably journaled in the flange 38 for additional support.

Figure 1:
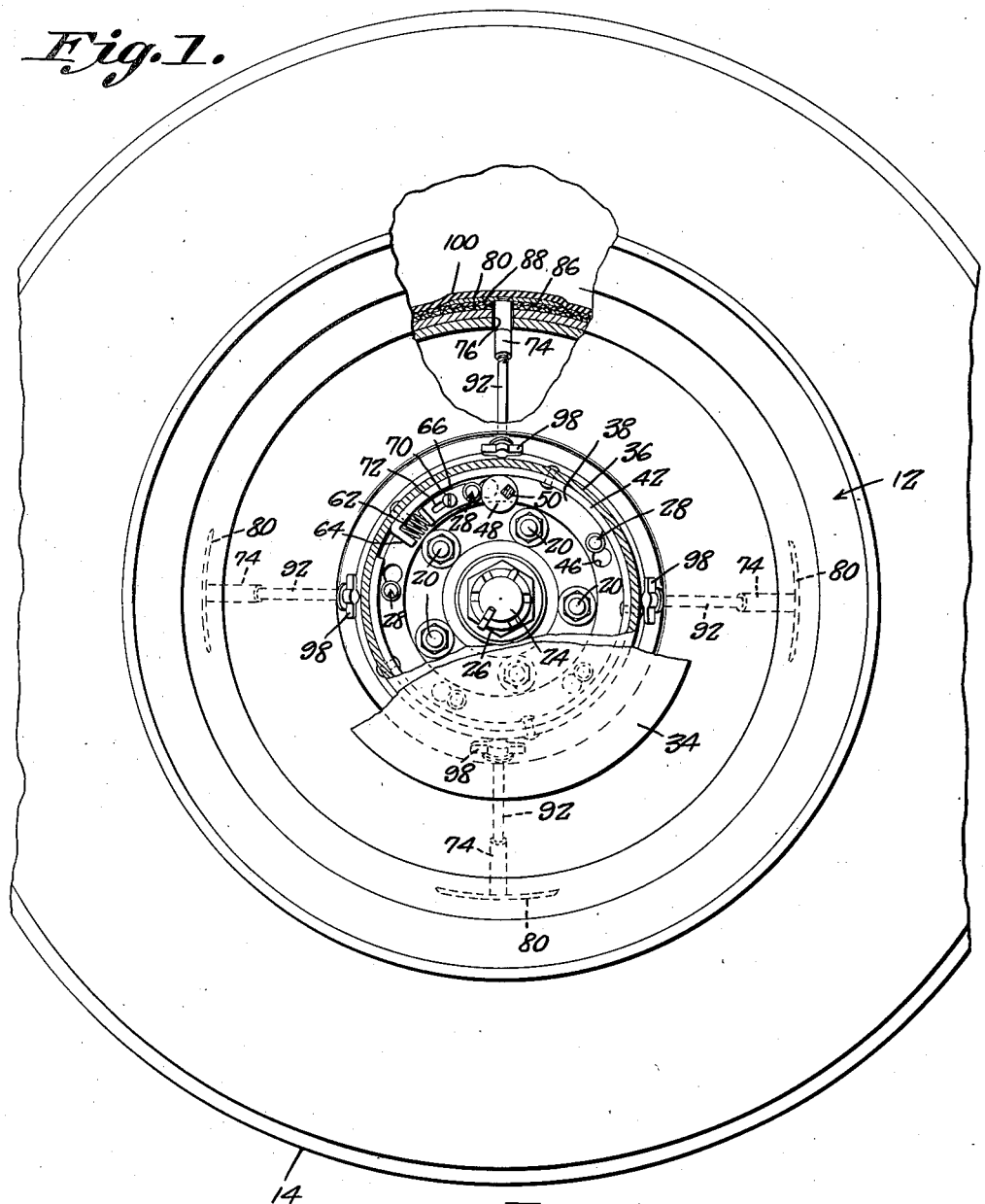
Figure 1 is a face view partly in section of a conventional automobile wheel and tire illustrating my invention incorporated therein.

With the cam 48 positioned in Figure 6, the enlargements 46 are axially aligned with the pins 28 so that the cap member 32 and its flange 38 may be removed from the wheel structure or easily slipped into position on the pins 28. As the flange 38 is brought into position on the pins 28, a slight clockwise rotation of the flange, as when viewing Figure 6, brings the pins 28 to the other ends of the slots and secures the flange against relative axial movement. Such rotation of the flange 38 is attained through rotation of the key 58 throughout one-half revolution. A half turn of the key brings the cam 48 to the position of Figure 1, with the cam arranged to have camming engagement with one of the pins 28 to impart rotation to the flange 38 and the cap 32. The axis of the spindle 50 is located slightly closer to the wheel axis than the pins 28 so that the cam 48 will be effectively latched in the position of Figure 1 through its engagement with the flange 42 and its cooperative pin 28.

To compensate for play and to hold the cam 48 against accidental rotation, a compression spring 62 has one end engaging a lug 64 struck from the flange 42 and its other end engaging a body 66 lying against one face of the flange 38 and arranged for end engagement with the pin 28 coacting with the cam 48. This end of the body 66 is slightly recessed at 68 to fit the curvature of the pin 28, and the body is slidably connected with the flange 38 by reason of a screw 70 threaded into the flange 38 and fitting loosely in a slot 72 in the body 66.

Referring to Figure 6, clockwise rotation of the cam 48 brings the cam into pressure engagement with the pin 28 for imparting clockwise rotation to the flange 38. Such rotation of the flange 38 places the spring 62 under additional compression but the cam 48 is frictionally latched in position through its engagement with the pin 28 and the flange 42. To remove the flange 38 from the pins 28, a half turn of the cam 48 in a counter-clockwise rotation permits the spring 62 to impart counter-clockwise rotation to the flange 38 to bring the pins 28 coaxially of the enlargements 46. When under compression, the spring holds the flange 38 in its latched relationship with the pins 28 and the cam is held firmly in engagement with the pin 28 so as to eliminate objectionable lost motion and to prevent accidental rotation of the cam.

The ornamental cap plate 34 is of larger diameter than the dished formation 22 so as to provide an enclosure therefor. Thus the latching mechanism is protectively housed inside the dished formation 22 and underneath the two cap members 32 and 34. These two cap members have configurations similar to conventional hub caps and are therefore not objectionable from the standpoint of appearance. Thus the axle nut 26 and the hub bolts 20 are protectively housed and are rendered accessible only through removal of the protective cap structure through the aid of a key fitting the lock.

Figure 3:
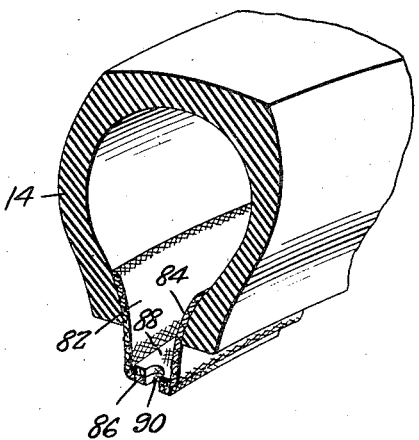
Figure 3 is a sectional perspective view of a portion of the tire securing means.
Figure 4:
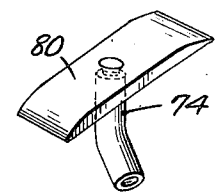
Figure 4 is a perspective view of a clamping device operating in conjunction with the structure of Figure 3.
Figure 5:
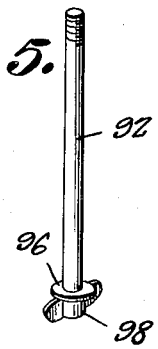
Figure 5 is a securing bolt coacting with the part of Figure 4.

Means are also provided for securing the tire casing 14 from unauthorized removal from the rim 12. Such means comprise a plurality of nuts 74 passing loosely through openings 76 in the well structure 78 of the rim. Each nut 74 is fixedly secured to a metal plate 80 of such width as to be freely receivable in the circumferential well formation 78. Two flaps 82 and 84 are secured to the inner faces of the tire casing 14, as by vulcanizing, and in the manner best illustrated in Figure 3. The flap 82 is provided with a margin 86 overlapping the margin 88 of the flap 84. The two overlapping margins 86 and 88 lie on the bottom of the well formation 78. I prefer to secure the plates 80 to the margin 88, as by cementing thereto, with the two flaps provided with openings 90 for the reception of the nuts 74. Both flaps 82 and 84 comprise rubber and fabric material of strong construction.

The nuts 74 are angled outwardly, as in Figure 2, for connection with tightening bolts 92 passing through openings 94 in the dished formation 22. These bolts are provided with flanges 96 engageable with the dished formation and wing nuts 98 accessible for manipulation only when the cap members 32 and 34 are removed from the wheel. The plates 80 need not be clamped tightly against the margins 86 and 88, since the pressure of the inflated inner tube 100 causes the plates 80 to be pressed firmly against the overlapping margins to hold the latter firmly in position in the well formation 78. However, the plates do hold the margins in such anchored relationship with the well formation as to prevent unauthorized removal of the tire casing even when the latter is deflated. While the bolts 92 are accessible from a position adjacent the inner face of the wheel flange area 102, the bolts are restrained from rotation by reason of the wing nuts 98, which are so arranged as to engage the flange 36 to prevent rotation of the bolts. The flange 36 slips easily into position notwithstanding the wing nuts 98, but the latter must be turned to predetermined positions before the flange will slip into place.

Both the nuts 74 and the bolts 92 may be made of relatively hard metal so as to increase the difficulty of severing the bolts, as by sawing. The bolts are located in rather difficult places for such unauthorized cutting, and considerable time would be necessary to sever the bolts. The bolts 92 may be easily tightened by hand.

Without further elaboration, the foregoing will so fully illustrate my invention, that others may, by applying current knowledge, readily adapt the same for use under various conditions of service.

I claim:

1. In an automotive vehicle wheel having a wheel member, a wheel member supporting hub structure, and hub bolts detachably connecting the wheel member with the hub structure; the combination of a hub cap shaped to coact with the wheel member to provide a protective enclosure for the hub bolts, anchor elements secured to said wheel member each having a recess, said hub cap being provided with openings for receiving said anchor elements and slots communicating with said openings to receive the recessed extents of the anchor elements when the hub cap is rotated relatively thereto, a key-actuated cam coacting with one of said anchor elements and the hub cap for rotating the latter and positioning the recessed extents of the anchor elements in said slots when turned in one direction and to latch the hub cap against rotation in a reverse direction, and resilient means acting on said hub cap and said one anchor element for rotating the hub cap in the reverse direction when said key-actuated cam is rotated in a second direction for bringing the said openings in coaxial registration with the respective anchor elements.

2. In an automotive vehicle wheel having a wheel member, a wheel member supporting hub structure, and hub bolts detachably connecting the wheel member with the hub structure; the combination of a hub cap shaped to coact with the wheel member to provide a protective enclosure for the hub bolts, anchor pins secured to said wheel member each having a circumferential groove, a flange fixed to said hub cap provided with slots for freely receiving the grooved extents of the anchor pins, said slots having enlargements for freely receiving said anchor pins and said anchor pins being receivable in said slots through relative rotation of the flange with the hub cap, and key-actuated means coacting with one of said anchor pins and the hub cap to latch the hub cap against relative rotation to hold the anchor pins in the slots, said key-actuated means including an eccentric cam rotatable relatively to said one anchor pin and coacting therewith to hold the hub cap against relative rotation.

3. In an automotive vehicle wheel having a wheel member, a wheel member supporting hub structure, and hub bolts detachably connecting the wheel member with the hub structure; the combination of a hub cap shaped for coaction with said wheel member to provide a protective enclosure for said hub bolts, anchor elements secured to said wheel member and having shoulder means, said hub cap being provided with a fixedly related flange having slots for the reception of said anchor elements, said slots being contoured to freely receive said anchor elements when said hub cap is rotated to one position but to bring the flange into latching engagement with the shoulder means upon rotation of the hub cap in a reverse direction, and key-actuated means coacting with one of said anchor elements and said hub cap to latch the hub cap against relative rotation to hold said flange in latching engagement with said anchor elements, said key-actuated means including an eccentric cam rotatable relatively to said one anchor element and coacting therewith to hold the hub cap against relative rotation.

4. In an automotive vehicle wheel having a wheel member provided with a circumferential well, and a tire detachably mounted on said wheel member; the combination of means attached to said tire and lying in said well, nut means engaging said first mentioned means to clamp the latter to the well, bolt means threadedly connected with said nut means and coacting with said wheel member for bringing the nut means into clamping relationship with said first mentioned means, said bolt means being provided with head formations, and a hub cap having a key controlled lock connection with said wheel member and coacting with said heads to protectively enclose the latter and to restrain the bolt means from rotation.

5. The invention described in claim 4 wherein said first mentioned means comprise flaps each secured to one wall of the tire, the two flaps overlapping each other with said nut means extending to positions between the flaps.

LOUIS V. MALLORY.